(12) United States Patent
Lee

(10) Patent No.: US 6,199,814 B1
(45) Date of Patent: Mar. 13, 2001

(54) MULTI-FUNCTIONAL DOCUMENTARY CLAMPING HOLDER FOR COMPUTER TYPEWRITING

(75) Inventor: Chi-Hsien Lee, Taichung (TW)

(73) Assignee: Chih Lung Sheng Industrial Co., Ltd., Taichung (TW)

(*) Notice: Subject to any disclaimer, the term of this patent is extended or adjusted under 35 U.S.C. 154(b) by 0 days.

(21) Appl. No.: 09/404,472

(22) Filed: Sep. 24, 1999

(51) Int. Cl.⁷ ..................................................... B41J 11/02
(52) U.S. Cl. .................... 248/442.2; 248/447; 248/451
(58) Field of Search .................. 248/442.2, 918, 248/276.1, 452, 447, 458, 451; 400/718

(56) References Cited

U.S. PATENT DOCUMENTS

| | | | | |
|---|---|---|---|---|
| 794,099 | * | 7/1905 | Heaney | 248/442.2 |
| 1,811,118 | * | 6/1931 | Fischer | 248/442.2 |
| 1,893,976 | * | 1/1933 | Anderson | 248/447 |
| 4,934,648 | * | 6/1990 | Yueh | 248/442.2 |
| 4,987,690 | * | 1/1991 | Aaldenberg et al. | 248/447 |
| 5,297,768 | * | 3/1994 | Denton | 248/442.2 |
| 5,505,421 | * | 4/1996 | Marthaler | 248/442.2 |
| 5,687,945 | * | 11/1997 | Lee | 248/442.2 |
| 5,845,889 | * | 12/1998 | Suzuki | 248/451 |

* cited by examiner

Primary Examiner—Leslie A. Braun
Assistant Examiner—Gwendolyn Baxter
(74) Attorney, Agent, or Firm—Bacon & Thomas, PLLC

(57) ABSTRACT

An improved multi-functional documentary clamping holder for computer typewriting comprises a support framework composed of a coupling base and a panel-clamping frame, wherein one end of the support framework is inserted in a panel, the other is united with a disposal platform or an adhering board for placing this invention beside or on a computer monitor alternatively. In virtue of two snap buttons pivotally disposed between a movable arm and the coupling base, two clamping pieces pivotally disposed in the movable arm, an insertion-disposed piece in the panel, and an indented groove, the panel can be moved vertically, horizontally, or turned around in a predetermined three-dimensional space.

5 Claims, 9 Drawing Sheets

MULTI-FUNCTIONAL DOCUMENTARY CLAMPING HOLDER FOR COMPUTER TYPEWRITING

BACKGROUND OF THE INVENTION

1. Field of the Invention

This invention relates to peripheral equipment of computer, more particularly, to a multi-functional documentary clamping holder that is adjustable in various angles and disposable on a desk or beside a monitor at will.

2. Description of the Prior Art

As it is well known that a computer can be used for learning language, augmenting knowledge, linking a network for communication with different people all over the world or searching data, computer graphing, data storing, or composing, etc. When computer typewriting in early days, a typist was supposed busy in swaying her head back and forth between a monitor and a documentary sheet on a desk. For eliminating the inconvenience, a documentary clamping holder shown in FIG. 1 has been developed later on and used to clamp at an edge of worktable. This prior documentary clamping holder comprises an extendable holding arm disposed on its top having a joint for adjusting angle and direction and a panel for loading documents coupled with its open end being adjustable in oblique angle. Nevertheless, such a prior documentary clamping holder is not deft enough in adjustment with its limited holding arm that can scarcely satisfy various requirements. Another kind of a prior clamping holder shown in FIG. 2 is provided with a cantilever having a stationary base at one end fixed in a corner of computer monitor and a fixing clamp at the other that can only clamp a sheet of paper. Anyway, the function of the prior documentary clamping holder is imperfect in one way or another and is pending for improvement.

SUMMARY OF THE INVENTION

The primary object of this invention is to provide an improved multi-functional documentary clamping holder for computer typewriting with a deft structure, which doesn't occupy too much space when stored, can be assembled simply and adjusted easily. Particularly, as it can be adjusted in a three-dimensional space, it may be located on a desk or beside a monitor for a user to adjust for an optimum angle.

For achieving the abovesaid object, this invention is provided with a support framework composed of a coupling base and a panel-clamping frame, wherein one end of the support framework is inserted in a panel, the other is united with a disposal platform or an adhering board for placing this invention beside or on a computer monitor alternatively. In virtue of two snap buttons pivotally disposed between a movable arm and a coupling base, two clamping pieces pivotally disposed in the movable arm, an insertion-disposed piece in the panel, and an indented groove, the panel can be moved vertically, horizontally, or turned around in a predetermined three-dimensional space.

BRIEF DESCRIPTION OF THE DRAWINGS

For a better understanding to the present invention, together with further advantages or features thereof, at least one preferred embodiment will be elucidated below with reference to the annexed drawings in which.

DETAILED DESCRIPTION OF THE PREFERRED EMBODIMENT

Figure 1:
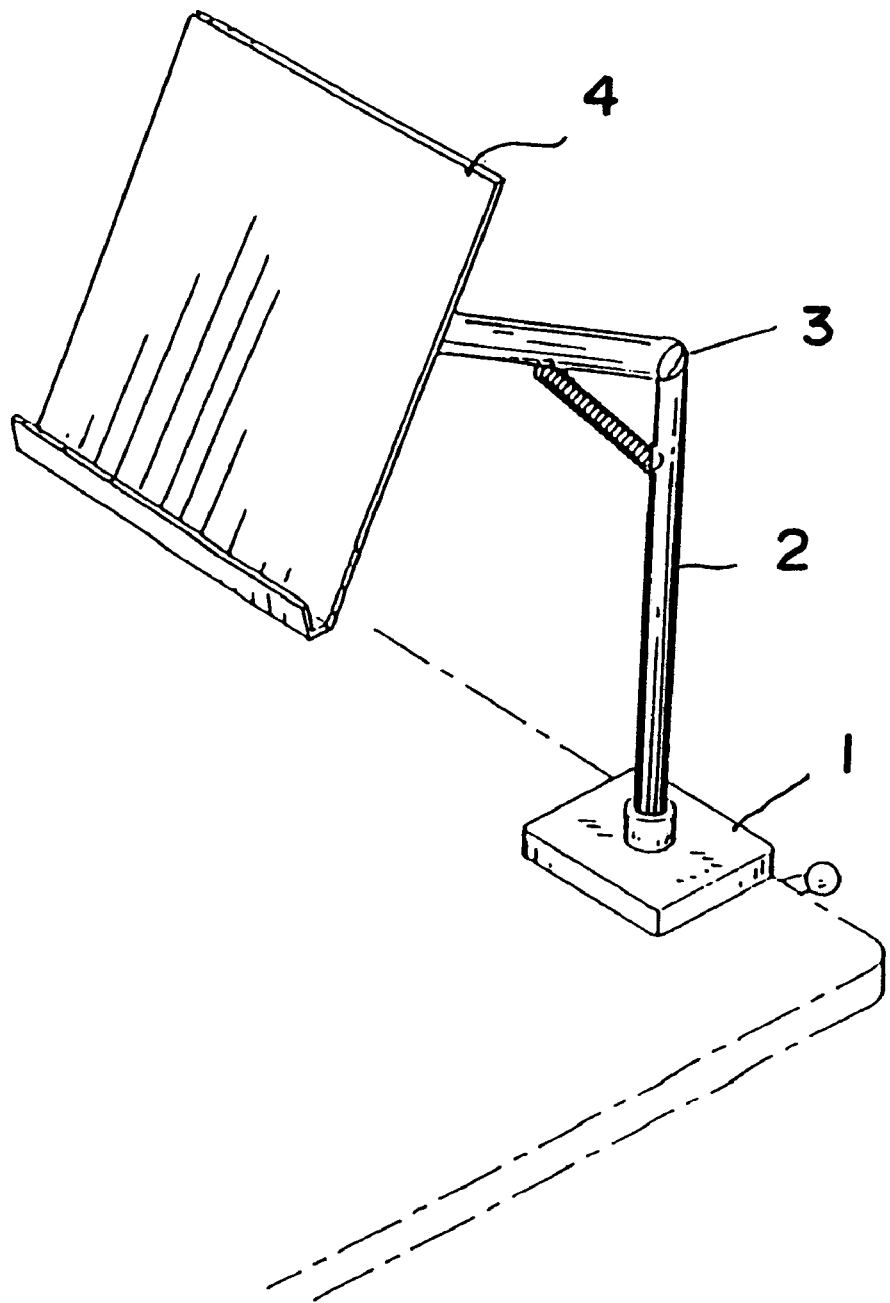
FIG. 1 is a schematic elevational view of a prior documentary clamping holder.
Figure 2:
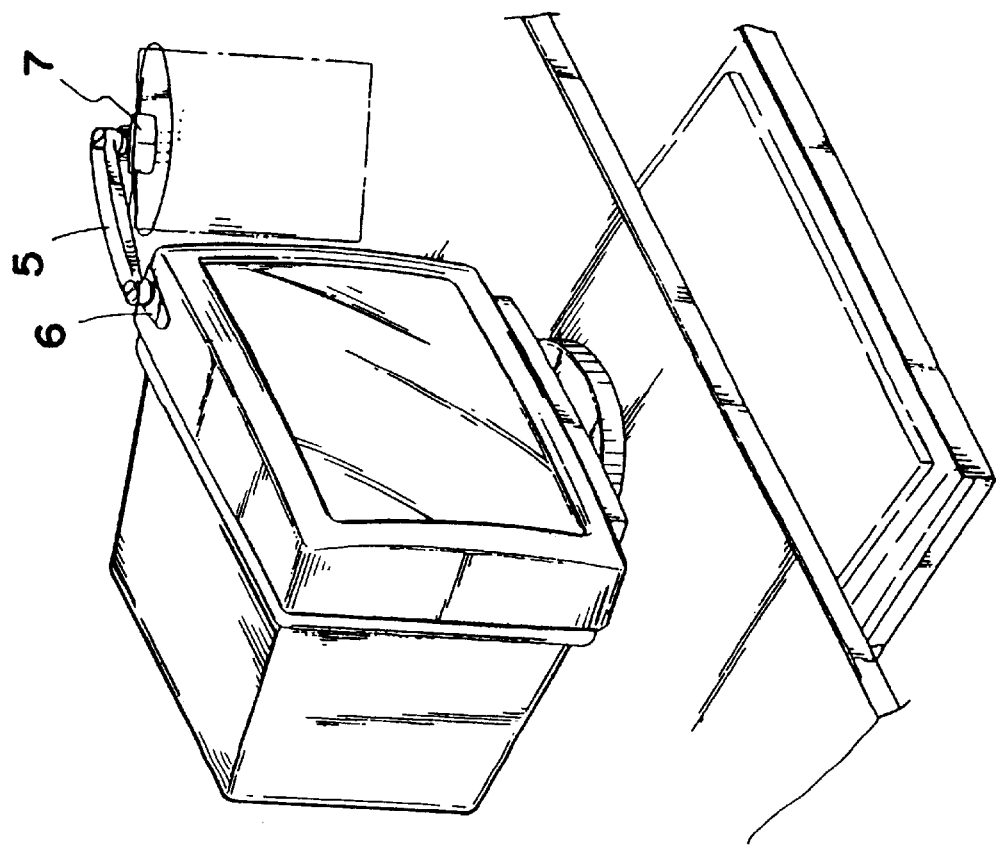
FIG. 2 is a schematic elevational view of another prior documentary clamping holder.
Figure 3:
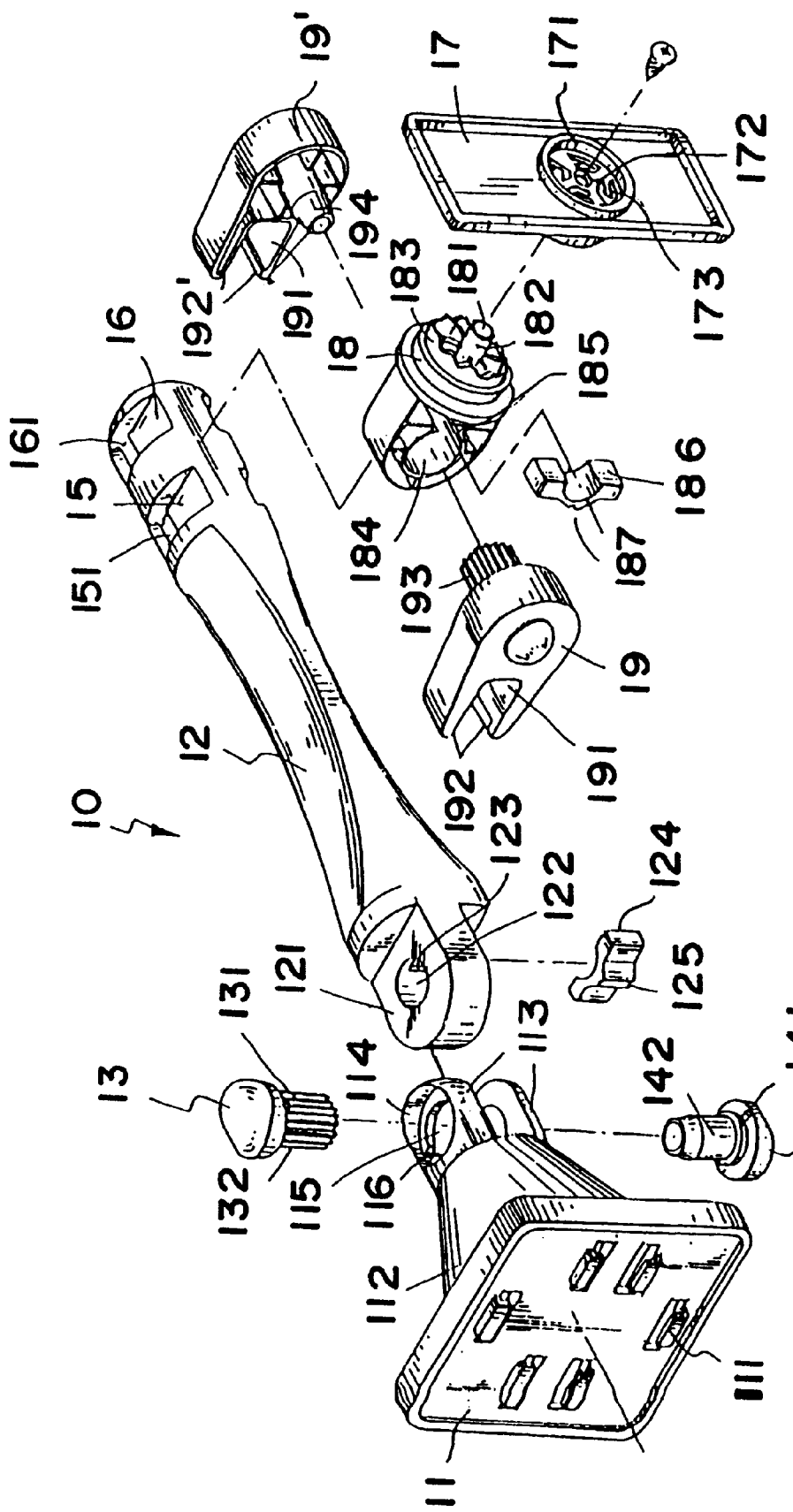
FIG. 3 is an exploded view showing a clamping holder of a preferred embodiment of this invention.
Figure 4:
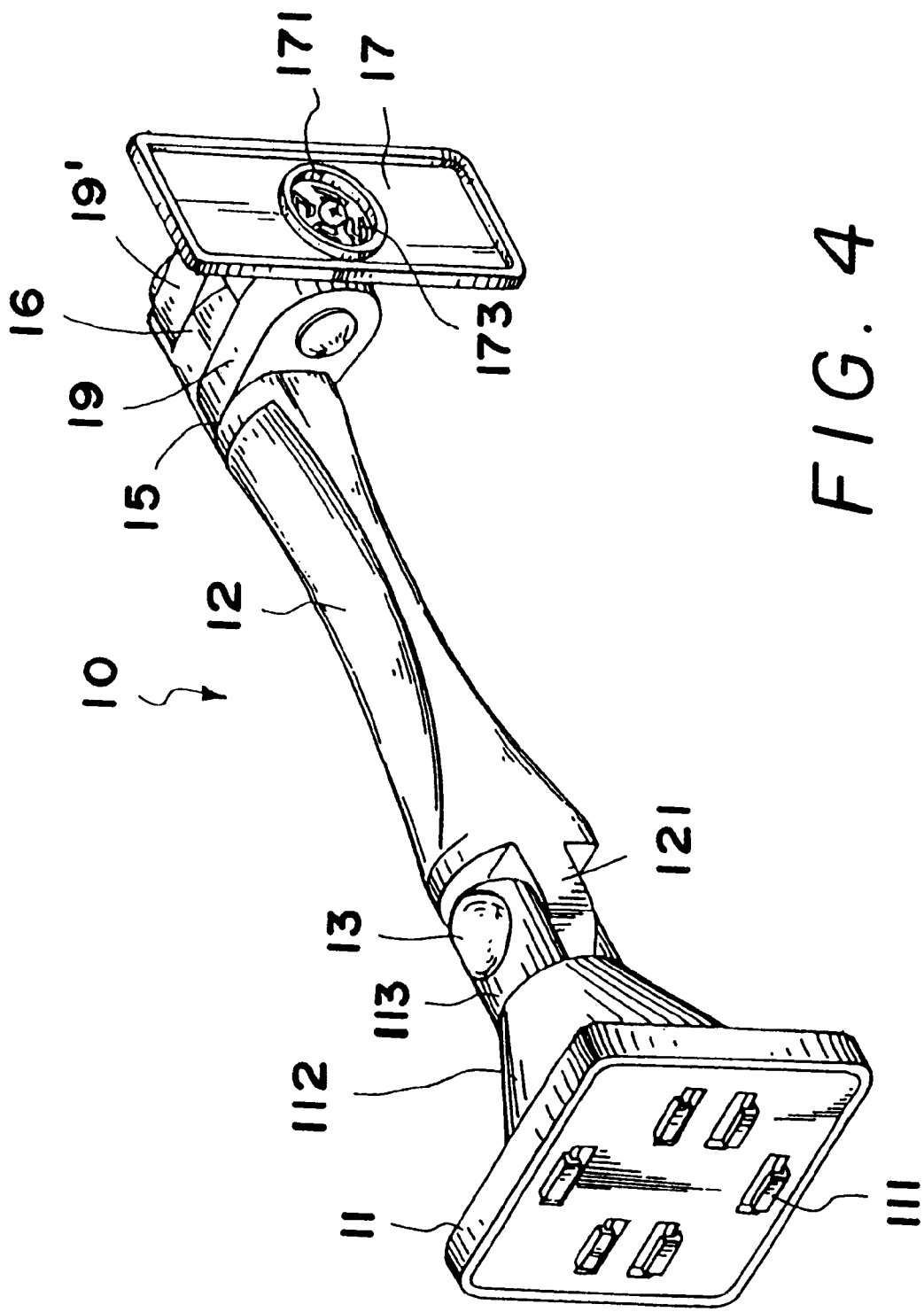
FIG. 4 is an elevational view showing the clamping holder of the preferred embodiment of this invention.
Figure 5:
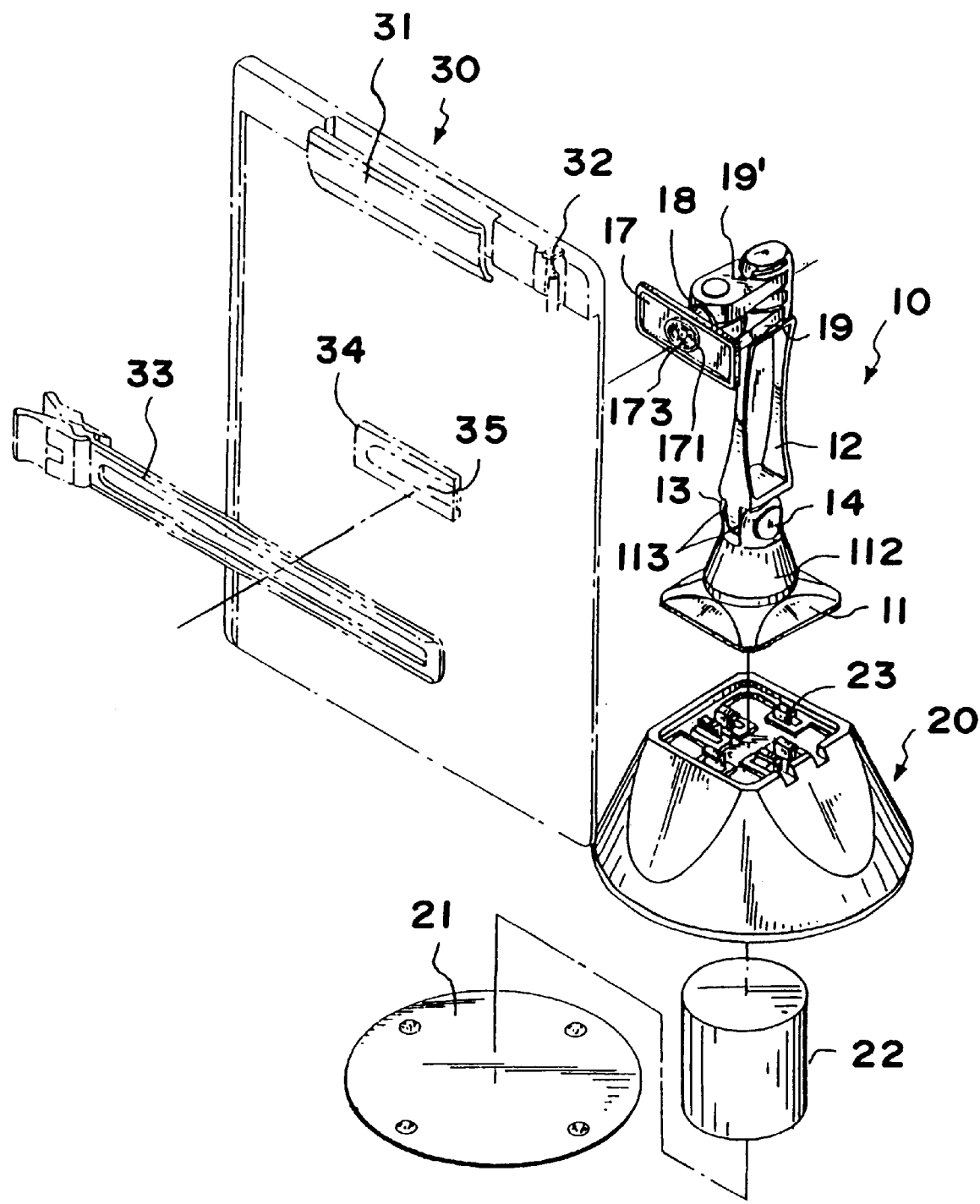
FIG. 5 is an exploded view of the preferred embodiment of this invention.
Figure 6:
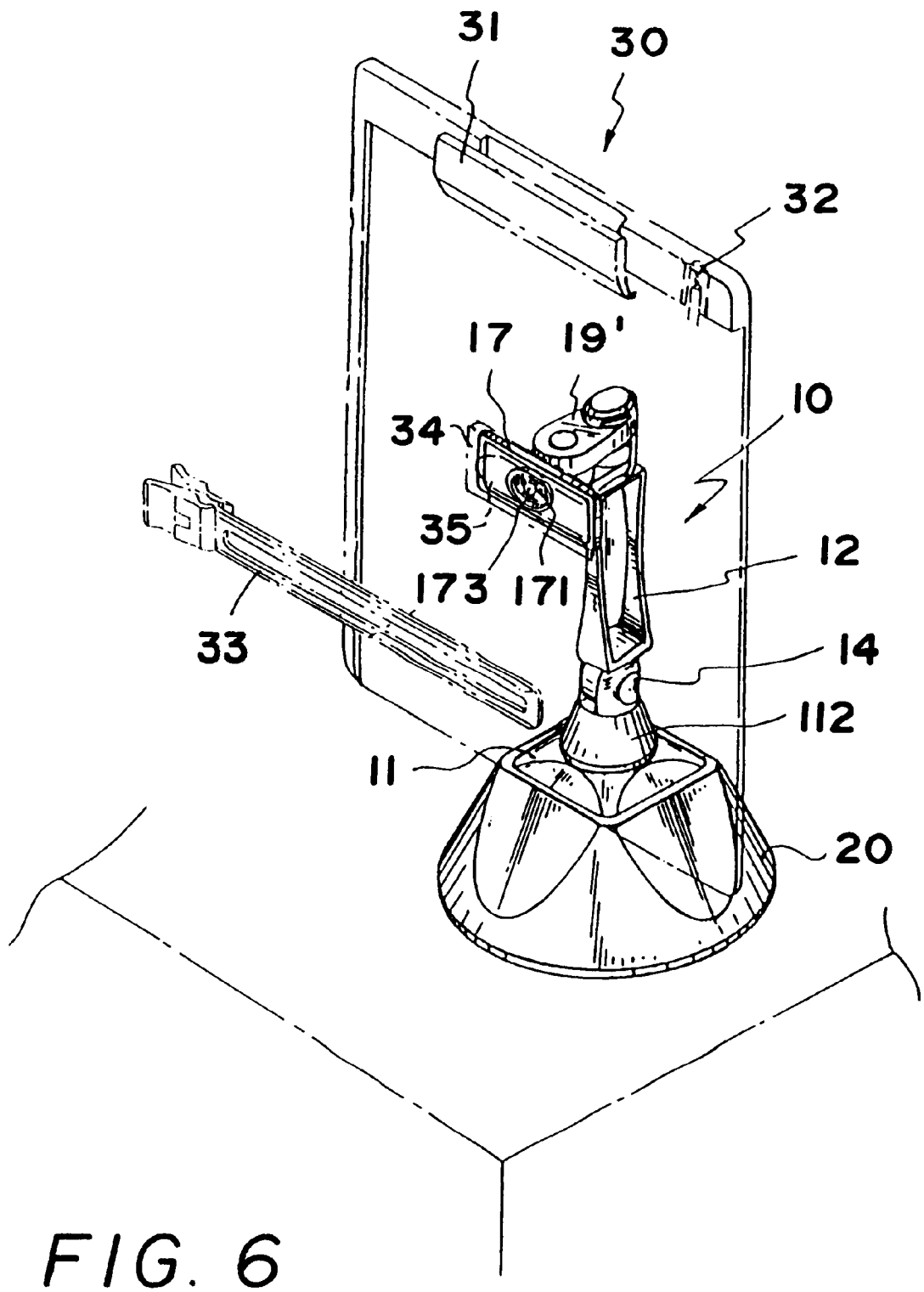
FIG. 6 is an elevational and practiced view of the preferred embodiment of this invention.
Figure 7:
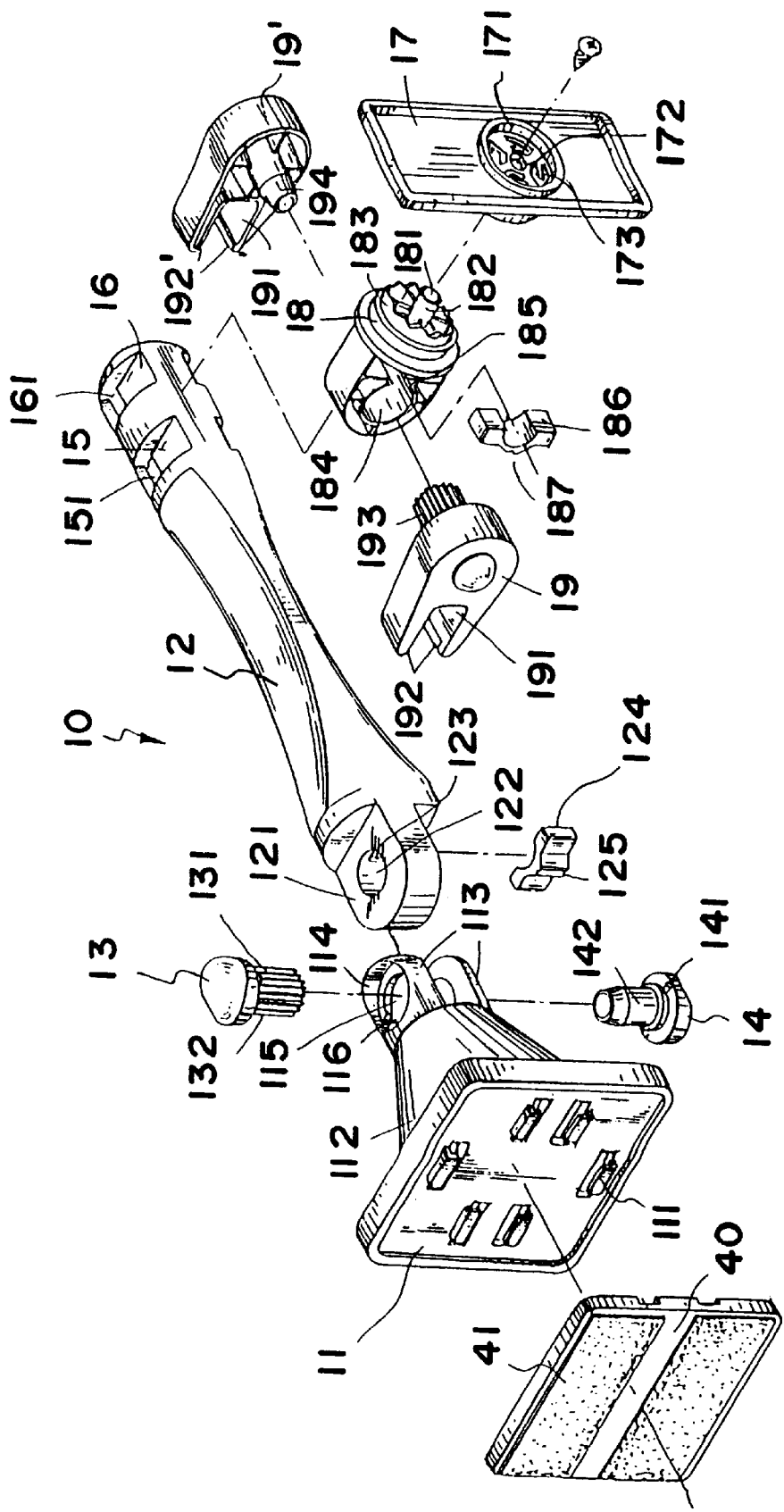
FIG. 7 is an exploded view of another preferred embodiment of this invention.

As shown in FIG. 3 through FIG. 10, a clamping holder for computer typewriting of this invention is formed by fixedly inserting one end of a support framework 10 in a disposal platform 20 while the other end is engaged with a panel 30. The support framework 10 further comprises a coupling base 11, a movable arm 12, and a panel-clamping frame 17.

The coupling base 11 is composed of three pairs of insertion-disposed pieces 111, wherein each pair of insertion-disposed pieces 111 is separated and located oppositely in a recessed face of the coupling base 11; an approximate conic rod 112 is protrusively formed on the other plane face of the coupling base 11; two coupling pieces 113 in parallel are protrusively mounted on an open end of the conic rod 112; a tapered trough 114 with a centered through hole 115 is formed in each coupling piece 113 respectively; and two additional position-regulating snap flutes 116 are formed at opposite positions in the tapered trough 114.

The movable arm 12 is provided with a flat and hollow semi-circular joint piece 121 at its one end having a circular through hole 122, wherein an open mouth 123 is formed in inner lateral wall of the through hole 122. A ratchet piece 124 having a segmental ratchet section 125 in a corresponding position relative to the open mouth 123 is arranged under the joint piece 121 for extendedly disposing the ratchet section 125 in the through hole 122. The joint piece 121 is extendedly inserted between those two coupling pieces 113 and to be locked by a pair of snap buttons 13, 14. A pair of snap protrusions 131, 141 is formed at corresponding positions in bottom face of the snap buttons 13, 14 respectively for engaging with the position-regulating snap flutes 116 in the coupling pieces 113 to fix the snap buttons 13, 14, wherein an end face of the snap button 13 is extended to form a hollow ratchet pin 132 with a row of longitudinal ratchet teeth for engaging with the segmental ratchet section 125, and a level and smooth pin 142 with a relatively shorter outer diameter than the inner diameter of the hollow ratchet pin 132 is extended from the other snap button 14 for extendedly disposing in the latter.

When the movable arm 12 is pulled, it will slide or swing to drive the segmental ratchet section 125 of the ratchet piece 124 to slide or turn and change the engaged position of the snap button 13. A plurality of recessed grooves 15, 16 having a snap structure 151, 161 in inner edge individually is disposed at the other end on top and bottom face of the movable arm 12.

A pivot-jointing seat 171 is protrusively disposed at one lateral face of the panel-clamping frame 17, wherein the pivot-jointing seat 171 is recessed and having its open mouth faced outwardly; a through hole 172 formed in center position is further provided with an elastic insertion-disposed piece 173 formed in its circumferential inner face; a pivot-jointing piece 18 is pivotally mounted on the pivot-jointing seat 171. A pivot rod 182 having a taped hole 181 is centered at one lateral face of the pivot-jointing piece 18, wherein an indented groove 183 is annularly disposed around the pivot rod 182 for accommodating the insertion-disposed piece 173 that is to change its position in the indented groove 183 when the panel-clamping frame 17 turns around. Moreover, a through hole 184 is formed on the other lateral face of the pivot-jointing piece 18, wherein an opening 185 is arranged in inner wall of the through hole 184; a ratchet piece 186 is offered with a segmental ratchet section 187 in a position corresponding to the opening 185 to be extendedly inserted in the through hole 184. A clamping piece 19, 19' is added to each lateral end of the pivot-jointing piece 18 respectively, wherein each clamping piece 19, 19' is provided with a U-type clamping part 191, 191' having a buckle 192, 192' at its open end for clamping the U-type clamping part 191, 191' at the recessed grooves 15, 16 of the movable arm 12 and clamping the buckle 192, 192' fixedly at the snap structure 151, 161 accordingly. Further, a hollow ratchet rod 193 is protrusively formed in axial direction in the inner face of one clamping piece 19 for engaging with the segmental ratchet section 187. On the other hand, a level and smooth rod 194 is formed in the inner face of the other clamping piece 19' with an outer diameter approximately equal to the inner diameter of the hollow ratchet rod 193, so that the former can be penetrably inserted in the latter. The inclination angle of the panel-clamping frame 17 may be changed to drive the pivot-jointing piece 18 to slide or turn, so that the engaged position of the ratchet section 187 with the hollow ratchet rod 193 can be changed too and the opening 185 of the pivot-jointing piece 18 will act elastically to let the ratchet teeth slide and snap again smoothly without conspicuous wear.

A bottom closure 21 is arranged at bottom of the conic disposal platform 20, and a weight 22 is placed in the disposal platform 20 for stable balance. A plurality of insertion-disposed pieces 23 corresponding with the insertion-disposed pieces 111 in the coupling base 11 is disposed in the top end of the disposal platform 20 for combining with the support framework 10.

A stationary clamp 31 is fixed at an upper end of the panel 30 having a relatively larger disposal area for clamping an original document, and a movable clamping piece 32 is disposed beside the stationary clamp 31 for clamping a pencil or ball pen. Further, a movable clamp 33 is arranged on the panel 30 for indicating a position pending typewriting, and a stationary block 34 fixed at a proper position on back of the panel 30 provides an insertion groove 35 for inserting and fixing the panel-clamping frame 17 of the support clamping framework 10 to unite the panel 30 and the clamping framework 10 to become an integral unit.

This invention composed of above said components can be placed nearby a computer monitor with stable balance in virtue of the weight 22 in the disposal platform 20 for preventing it from falling down. With function of a pivotally disposed snap button 13, 14 between the movable arm 12 and the coupling base 11, the panel 30 can be moved vertically in a predetermined angle; also, with function of the clamping piece 19, 19' pivotally disposed at the movable arm 12, the panel 30 can be moved horizontally in a predetermined angle; and, with function of the insertion-disposed piece 173 and the indented groove 183, the panel-clamping frame 17 can be turned in a predetermined angle; and, by the abovesaid architecture, this invention is benefited with a three-dimensional turnable capability for optimum adjustment.

Figure 9:
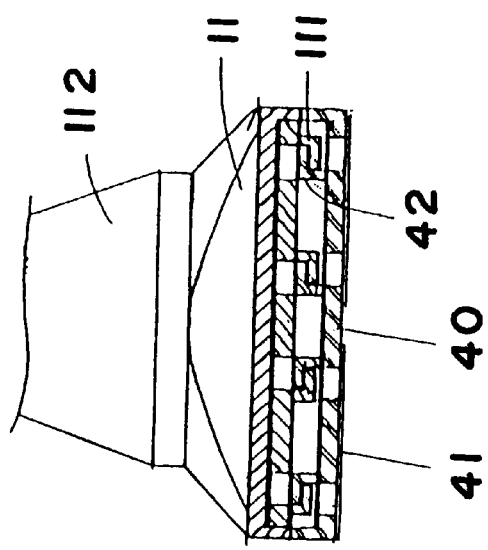
FIG. 9 is a vertical sectional view showing combination of another preferred embodiment and the attachable board of this invention.
Figure 8:
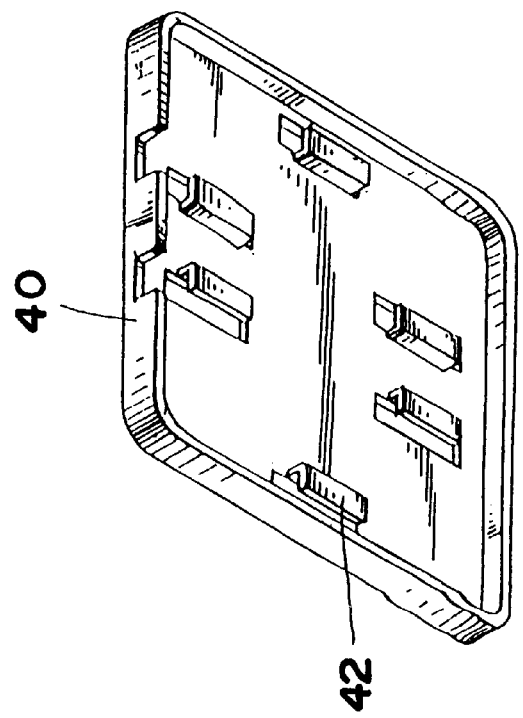
FIG. 8 is an elevational view of an attachable board of another preferred embodiment of this invention.
Figure 10:
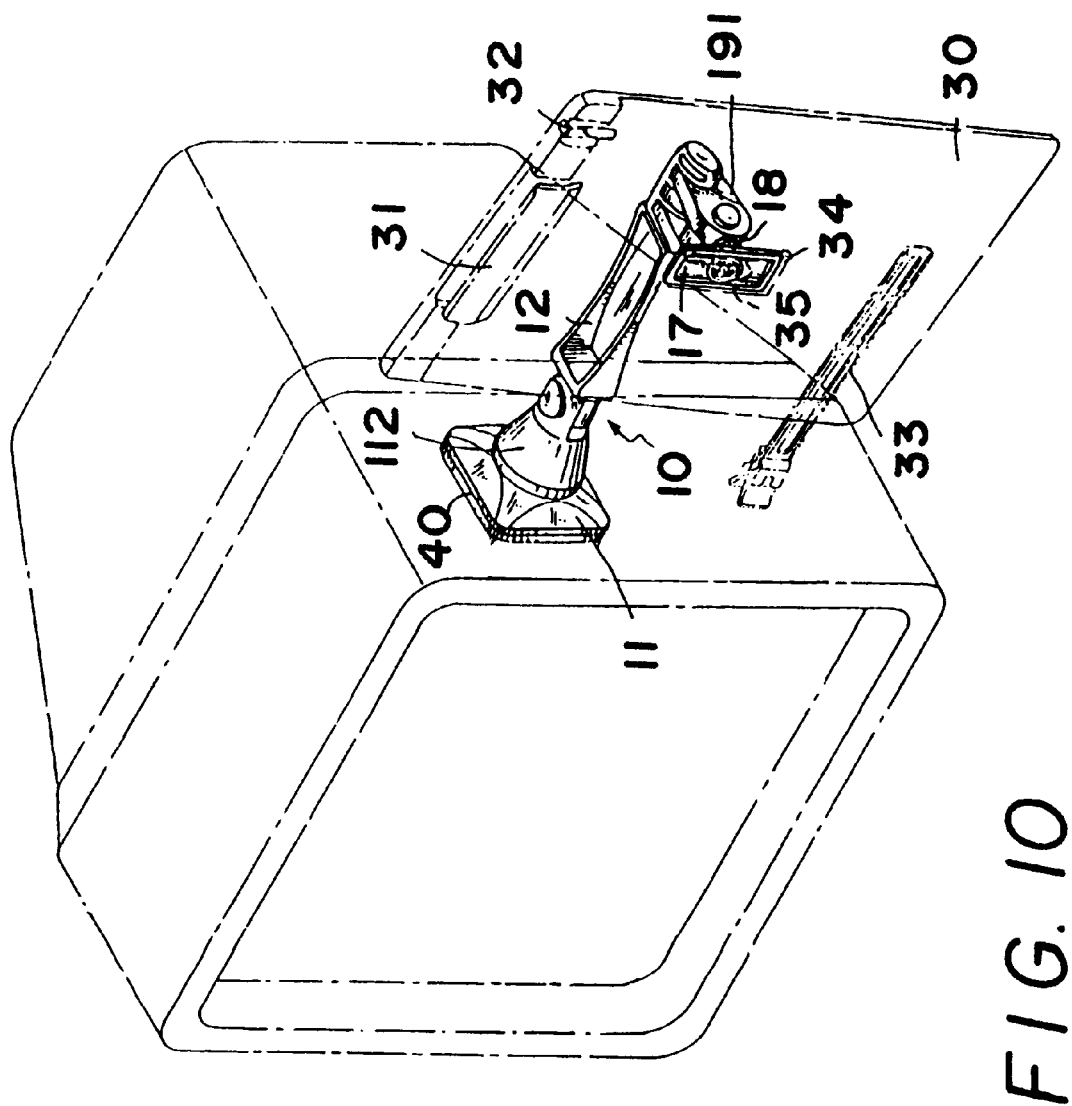
FIG. 10 is an elevational and practiced view of another preferred embodiment of this invention.

Alternatively, this invention may be disposed laterally on a monitor as shown in FIG. 8 through 10, wherein the disposal platform 20 has been substituted by an adhering board 40, which is provided with an adhering division 41 at its one lateral face and a plurality of insertion-disposed pieces 42 at the other in positions corresponding to the insertion-disposed pieces 111 in the coupling base 11 for mutual insertion for integrating the support framework 10 and the adhering board 40 to thereby provide a three-dimensional turnable function as mentioned above.

Although, this invention has been described in terms of preferred embodiments, it is apparent that numerous variations and modifications may be made without departing from the true spirit and scope thereof, as set forth in the following claims.

What is claimed is:

1. A multi-functional documentary clamping holder for computer typewriting disposable on a desk or mountable laterally on a computer monitor by inserting one end of a support framework in a disposable platform and the other end in a panel, said support framework further comprising:

a coupling base composed of three pairs of insertion-disposed pieces, wherein each pair of said insertion-disposed pieces is separated and located oppositely in a recessed face of said coupling base; an approximate conic rod is protrusively formed on an other corresponding lateral face of said coupling base; two coupling pieces in parallel are protrusively mounted on an open end of said conic rod; a tapered trough with a centered through hole is formed in each said coupling piece respectively; and two additional position-regulating snap flutes are formed at opposite positions in said tapered trough;

a movable arm provided with a flat and hollow semi-circular joint piece at one end of said moveable arm having a circular through hole, wherein an open mouth is formed in inner lateral wall of said through hole; a ratchet piece having a segmental ratchet section in a corresponding position relative to said open mouth is arranged under said joint piece for extendedly disposing said ratchet section in said through hole; and, said joint piece is extendedly inserted between said two coupling pieces for disposing a pair of snap buttons;

a panel-clamping frame having a pivot-jointing seat protrusively disposed at one lateral face of said panel clamping frame wherein said pivot-jointing seat is recessed and having open mouth said of pivot-jointing seat outwardly; a through hole formed in center position of said pivot-jointing seat is further provided with an elastic insertion-disposed piece formed in a circumferential inner face of said; a pivot-jointing seat piece is pivotally mounted on said pivot-jointing seat; a pivot rod having a taped hole protrusively centered at one lateral face of said pivot-jointing piece, and wherein an indented groove is annularly disposed around said pivot rod for accommodating said insertion-disposed piece, which will change its position of said insertion-disposed piece in the indented groove when said panel-clamping frame is turning around;

said disposal platform in approximate conic shape having a plurality of insertion-disposed pieces at end of said disposal platform corresponding with the insertion-disposed pieces in said coupling base for mutual insertion to unite said support framework and said disposal platform; and a stationary block fixed at a proper position on back of a panel providing an insertion groove for inserting and fixing said panel-clamping frame of said support clamping framework to unite said panel and said clamping framework to become an integral unit;

by pivotally disposing said snap button between said movable arm and said coupling base, pivotally disposing a clamping piece at said movable arm, and with function of said insertion-disposed piece and said indented groove arranged in said panel-clamping frame for turning said panel, said clamping holder being disposable nearby a computer monitor and adjustable of moving vertically or horizontally in a predetermined angle or turning around in a predetermined three-dimensional space.

2. The improved multi-functional documentary clamping holder for computer typewriting according to claim 1, wherein a pair of snap buttons in said movable arm having a pair of snap protrusions in corresponding shapes is formed at corresponding positions to be fixedly insertion-disposed in said position-regulating snap flutes of each coupling piece respectively; an end face of said snap button is extended to form a hollow ratchet pin with a row of longitudinal ratchet teeth for engaging with said segmental ratchet section, and a level and smooth pin with a relatively smaller outer diameter than the inner diameter of said hollow ratchet pin is extended from the other snap button for extendedly disposing in the latter; when said movable arm is pulled, said moveable arm will slide or swing to drive said segmental ratchet section of said ratchet piece to slide or turn and change the engaged position on the snap button; and a plurality of recessed grooves having a snap structure in inner edge respectively is disposed at the other end on top and bottom face of said movable arm.

3. The improved multi-functional documentary clamping holder for computer typewriting according to claim 1, wherein a through hole is formed on the other lateral face of said pivot-jointing piece, and an opening is arranged in inner wall of said through hole; a ratchet piece is offered with a segmental ratchet section in a position corresponding to said opening to be extendedly inserted in said through hole; a clamping piece is added to each lateral end of said pivot-jointing piece respectively, wherein each clamping piece is provided with a U-type clamping part having a buckle at an open end of said clamping part for clamping said U-type clamping part at said recessed grooves of said movable arm and clamping said buckle fixedly at a snap structure accordingly; further, a hollow ratchet rod having ratchet teeth is protrusively formed in axial direction in the inner face of said clamping piece for engaging with the segmental ratchet section; a level and smooth rod is formed in the inner face of the other clamping piece with an outer diameter approximately equal to the inner diameter of the hollow ratchet rod, so that the former can be penetrably inserted in the latter; and an inclination angle of the panel-clamping frame changeable to drive the pivot-jointing piece to slide or turn, therefore, an engaged position of the ratchet section with the hollow ratchet rod can be changed too and the opening of the pivot-jointing piece will act elastically to let the ratchet teeth slide and snap again smoothly without conspicuous wear.

4. The improved multi-functional documentary clamping holder for computer typewriting according to claim 1, wherein a disposal platform is substituted by an adhering board, which is provided with an adhering division at one lateral face of said disposal platform for adhering to the computer monitor; and a plurality of insertion-disposed pieces at the other lateral face of said disposal platform in positions corresponding to said insertion-disposed pieces in said coupling base for mutual insertion for integrating said support framework and said adhering board, so said clamping holder can be attached to a lateral face of the computer monitor.

5. The improved multi-functional documentary clamping holder for computer typewriting according to claim 1, wherein a stationary clamp is fixed at an upper end of a panel having a relatively larger disposal area for clamping an original document; a movable clamping piece is disposed beside the stationary clamp for clamping a pencil or ball pen; and, a movable clamp is arranged on the panel for indicating a position pending typewriting.

* * * * *